US009128577B2

(12) United States Patent
Polishchuk

(10) Patent No.: US 9,128,577 B2
(45) Date of Patent: Sep. 8, 2015

(54) HYBRID CAPACITIVE TOUCH SYSTEM DESIGN AND METHOD

(71) Applicant: Igor Polishchuk, Fremont, CA (US)

(72) Inventor: Igor Polishchuk, Fremont, CA (US)

(73) Assignee: Atmel Corporation, San Jose, CA (US)

( * ) Notice: Subject to any disclaimer, the term of this patent is extended or adjusted under 35 U.S.C. 154(b) by 71 days.

(21) Appl. No.: 14/102,222

(22) Filed: Dec. 10, 2013

(65) Prior Publication Data

US 2015/0160756 A1 Jun. 11, 2015

(51) Int. Cl.
G06F 3/045 (2006.01)
G06F 3/044 (2006.01)
G09G 5/00 (2006.01)

(52) U.S. Cl.
CPC ............... G06F 3/044 (2013.01); G09G 5/006 (2013.01); *G09G 2300/04* (2013.01)

(58) Field of Classification Search
CPC ......... G06F 1/169; G06F 3/041; G06F 3/044; G06F 3/045; G01R 27/2605; H01G 5/01; H01G 11/04
See application file for complete search history.

(56) References Cited

U.S. PATENT DOCUMENTS

| 7,663,607 | B2 | 2/2010 | Hotelling |
| 7,864,503 | B2 | 1/2011 | Chang |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 8,217,902 | B2 | 7/2012 | Chang |
| 8,493,358 | B2 * | 7/2013 | Rebeschi et al. ............... 345/174 |
| 8,508,502 | B2 * | 8/2013 | Souchkov ...................... 345/174 |
| 2008/0309635 | A1 | 12/2008 | Matsuo |
| 2009/0315854 | A1 | 12/2009 | Matsuo |
| 2010/0164889 | A1 * | 7/2010 | Hristov et al. ................ 345/173 |
| 2011/0157077 | A1 * | 6/2011 | Martin et al. ................. 345/174 |
| 2011/0261006 | A1 * | 10/2011 | Joharapurkar et al. ....... 345/174 |
| 2012/0242588 | A1 | 9/2012 | Myers |

(Continued)

FOREIGN PATENT DOCUMENTS

WO WO 2012/129247 A2 9/2012

OTHER PUBLICATIONS

U.S. Appl. No. 61/454,936, filed Mar. 21, 2011, Myers.

(Continued)

*Primary Examiner* — Joe H Cheng
(74) *Attorney, Agent, or Firm* — Baker Botts L.L.P.

(57) ABSTRACT

In one embodiment, a system includes first lines of conductive material and a touch sensor comprising second and third lines of conductive material inside and outside the touch sensor. The first lines of conductive material are outside the touch sensor and disposed between second lines of conductive material outside the touch sensor and the third lines of conductive material outside the touch sensor. The system further includes logic that is configured when executed to apply a ground signal to the first lines of conductive material and sense touch inputs at the touch sensor using mutual-capacitive touch sensing in response to determining to operate in a mutual-capacitive mode of operation, and apply a voltage signal to the first lines of conductive material and sense touch inputs at the touch sensor using self-capacitive touch sensing in response to determining to operate in a self-capacitive mode of operation.

21 Claims, 5 Drawing Sheets

(56) References Cited

U.S. PATENT DOCUMENTS

| | | |
|---|---|---|
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |
| 2013/0278538 A1* | 10/2013 | Brunet et al. ............ 345/174 |
| 2013/0307811 A1* | 11/2013 | Hanssen et al. ............ 345/174 |
| 2013/0342478 A1* | 12/2013 | Bae et al. ............ 345/173 |
| 2015/0022670 A1* | 1/2015 | Gozzini et al. ............ 348/187 |
| 2015/0023571 A1* | 1/2015 | Gozzini et al. ............ 382/124 |

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

HYBRID CAPACITIVE TOUCH SYSTEM DESIGN AND METHOD

TECHNICAL FIELD

This disclosure generally relates to touch sensors, and more particularly to sensor designs for hybrid capacitive touch sensors.

BACKGROUND

In current designs involving mutual-capacitive sensing, sensor line routing on a device must include a ground track between each pair of adjacent sensor lines that overlap in the touch sensor (e.g., sensor lines running in the X and Y direction). In addition, designs involving self-capacitive sensing require sensor line routing on a device to include a driven guard line between each driven sensor line (e.g., those running in the X direction) and an adjacent grounded sense line (e.g., those running in the Y direction). Accordingly, hybrid capacitive sensor designs that incorporate both mutual- and self-capacitive modes of sensing touch inputs may require an excessive amount of ground lines and guard lines to ensure proper functionality of the touch sensor. These numerous ground and guard lines in turn require excessive space on the edge or bezel of a device where the lines are routed, which may lead to a less appealing design, both functionally and aesthetically.

DESCRIPTION OF EXAMPLE EMBODIMENTS

Figure 1:
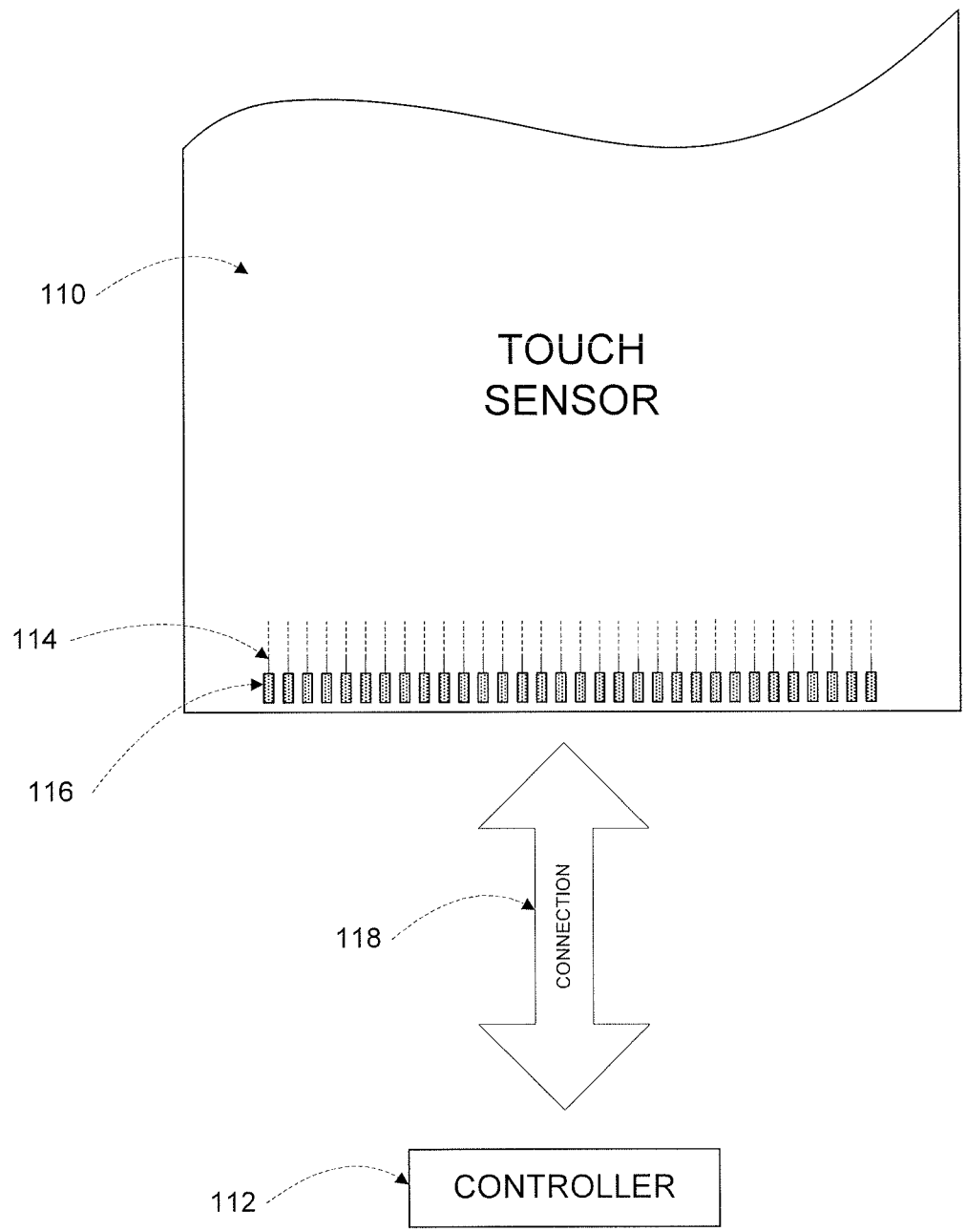
FIG. 1 illustrates an example hybrid capacitive touch sensor with an example touch-sensor controller according to particular embodiments of the present disclosure.

FIG. 1 illustrates an example hybrid capacitive touch sensor 110 with an example touch-sensor controller 112 according to particular embodiments of the present disclosure. Touch sensor 110 and touch-sensor controller 112 may detect the presence and location of a touch or the proximity of an object within a touch-sensitive area of touch sensor 110. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 110 may include one or more touch-sensitive areas, where appropriate. Touch sensor 110 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 110. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 110 and touch-sensor controller 112. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display. As another example, the mechanical stack may include the layers shown in FIGS. 2A-2B and described further below.

One or more portions of the substrate of touch sensor 110 may be made of polyethylene terephthalate (PET), glass, or another suitable material. This disclosure contemplates any suitable substrate with any suitable portions made of any suitable material. In particular embodiments, the drive or sense electrodes in touch sensor 110 may be made of ITO in whole or in part. In particular embodiments, the drive or sense electrodes in touch sensor 110 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 110 may implement a hybrid capacitive form of touch sensing, which may include both mutual- and self-capacitance sensing modes of operation in a capacitive sensor. In a mutual-capacitance implementations or modes of operation, touch sensor 110 may include an array of drive and sense electrodes forming an array of capacitive nodes. An overlapping area of a drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 112) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 112 may measure the change in capacitance. By measuring changes in capacitance throughout the array, touch-sensor controller 112 may determine the position of the touch or proximity within the touch-sensitive area(s) of touch sensor 110.

In a self-capacitance implementations or modes of operation, touch sensor 110 may include an array of electrodes of a single type that may each form a capacitive node. In some embodiments, touch sensor 110 may include an array of driven and grounded electrodes, with each area overlap between the driven and grounded electrode forming a capacitive node. When an object touches or comes within proximity of the capacitive node, a change in self-capacitance may occur at the capacitive node and touch-sensor controller 112 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 112 may determine the position of the touch or proximity within the touch-sensitive area(s) of touch sensor 110. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 110 may indicate a touch or proximity input at the position of the capacitive node. Touch-sensor controller 112 may detect and process the change in capacitance to determine the presence and location of the touch or proximity input. Touch-sensor controller 112 may then communicate information about the touch or proximity input to one or more other components (such one or more central processing units (CPUs)) of a device that includes touch sensor 110 and touch-sensor controller 112, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 112 may be one or more integrated circuits (ICs), such as for example general-purpose microprocessors, microcontrollers, programmable logic devices or arrays, application-specific ICs (ASICs). In particular embodiments, touch-sensor controller 112 comprises analog circuitry, digital logic, and digital non-volatile memory. In particular embodiments, touch-sensor controller 112 is disposed on a flexible printed circuit (FPC) bonded to the substrate of touch sensor 110, as described below. The FPC may be active or passive, where appropriate. In particular embodiments, multiple touch-sensor controllers 112 are disposed on the FPC. Touch-sensor controller 112 may include a processor unit, a drive unit, a sense unit, and a storage unit. The drive unit may supply drive signals to the drive electrodes of touch sensor 110. The sense unit may sense charge at the capacitive nodes of touch sensor 110 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 110. The processor unit may also track changes in the position of a touch or proximity input within the touch-sensitive area(s) of touch sensor 110. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 114 of conductive material disposed on the substrate of touch sensor 110 may couple the drive or sense electrodes of touch sensor 110 to connection pads 116, also disposed on the substrate of touch sensor 110. As described below, connection pads 116 facilitate coupling of tracks 114 to touch-sensor controller 112. Tracks 114 may extend into or around (e.g. at the edges of) the touch-sensitive area(s) of touch sensor 110. Particular tracks 114 may provide drive connections for coupling touch-sensor controller 112 to drive electrodes of touch sensor 110, through which the drive unit of touch-sensor controller 112 may supply drive signals to the drive electrodes. Other tracks 114 may provide sense connections for coupling touch-sensor controller 112 to sense electrodes of touch sensor 110, through which the sense unit of touch-sensor controller 112 may sense charge at the capacitive nodes of touch sensor 110. Tracks 114 may be made of fine lines of metal or other conductive material. As an example and not by way of limitation, the conductive material of tracks 114 may be copper or copper-based and have a width of approximately 100 μm or less. As another example, the conductive material of tracks 114 may be silver or silver-based and have a width of approximately 100 μm or less. In particular embodiments, tracks 114 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 114, touch sensor 110 may include one or more ground lines terminating at a ground connector (which may be a connection pad 116) at an edge of the substrate of touch sensor 110 (similar to tracks 114).

Connection pads 116 may be located along one or more edges of the substrate, outside the touch-sensitive area(s) of touch sensor 110. As described above, touch-sensor controller 112 may be on an FPC. Connection pads 116 may be made of the same material as tracks 114 and may be bonded to the FPC using an anisotropic conductive film (ACF). Connection 118 may include conductive lines on the FPC coupling touch-sensor controller 112 to connection pads 116, in turn coupling touch-sensor controller 112 to tracks 114 and to the drive or sense electrodes of touch sensor 110. In another embodiment, connection pads 116 may be connected to an electro-mechanical connector (such as a zero insertion force wire-to-board connector); in this embodiment, connection 118 may not need to include an FPC. This disclosure contemplates any suitable connection 118 between touch-sensor controller 112 and touch sensor 110.

Figure 2:
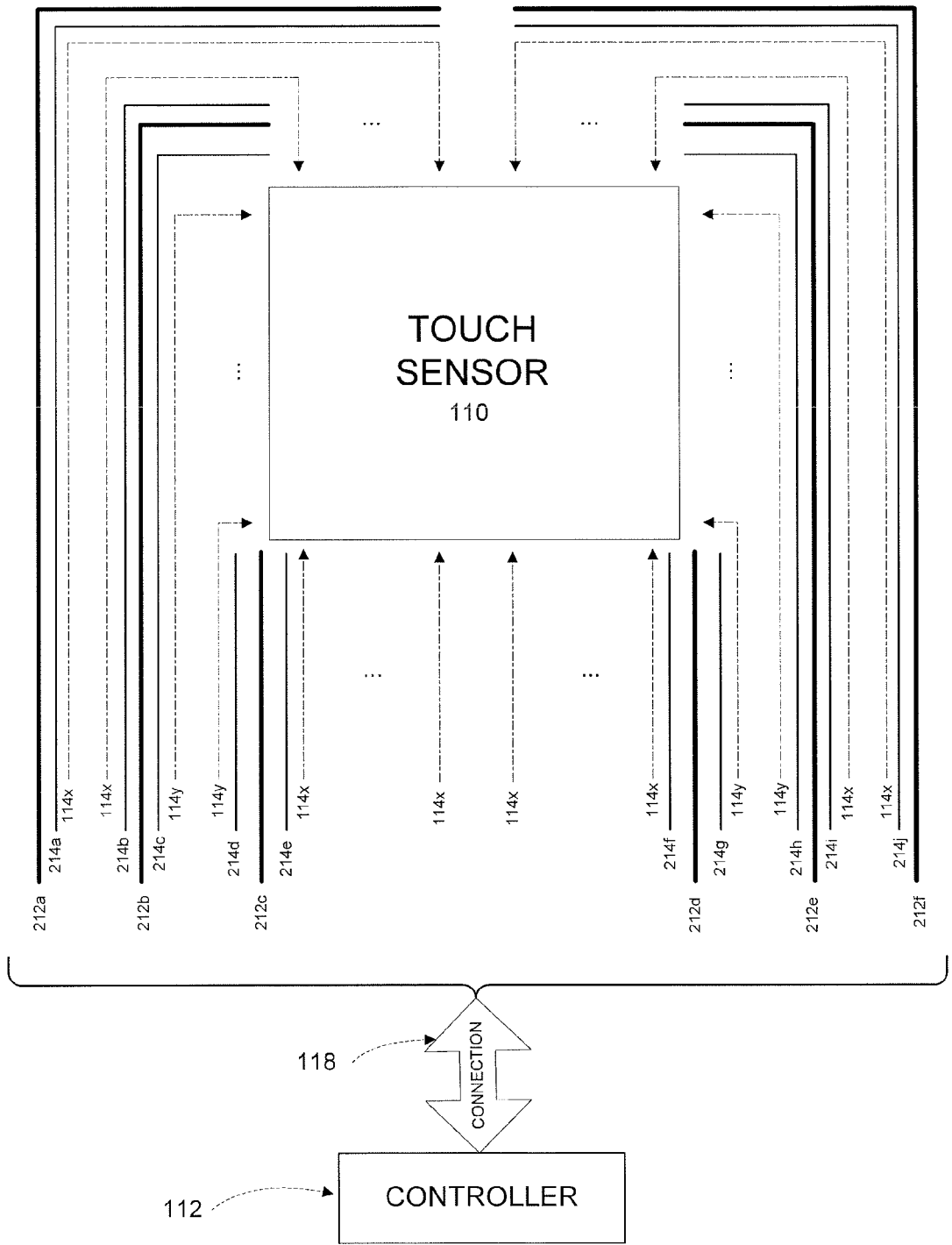
FIG. 2 illustrates an example trace routing diagram for hybrid capacitive touch sensors according to particular embodiments of the present disclosure.

FIG. 2 illustrates an example trace routing diagram for hybrid capacitive touch sensor 110 according to particular embodiments of the present disclosure. In current designs involving mutual-capacitive sensing, sensor line routing on a device must include a ground track between each pair of adjacent sensor lines that overlap in the touch sensor (e.g., sensor lines running in the X and Y direction). In addition, designs involving self-capacitive sensing require sensor line routing on a device to include a driven guard line between each driven sensor line (e.g., those running in the X direction) and an adjacent grounded sense line (e.g., those running in the Y direction). Accordingly, hybrid capacitive sensor designs that incorporate both mutual- and self-capacitive modes of sensing touch inputs may require an excessive amount of ground lines and guard lines to ensure proper functionality of the touch sensor. These numerous ground and guard lines in turn require excessive space on the edge or bezel of a device where the lines are routed, which may lead to a less appealing design, both functionally and aesthetically.

For example, as shown in FIG. 2, hybrid capacitive touch sensor 110 has sensor lines 114x and 114y (representing tracks running along sensor 110 in the X and Y directions, respectively) exiting the sensor 110 and being routed around sensor 110 toward connection 118 to connect to controller 112. Although only four sensor lines 114x and two sensor lines 114y are shown in FIG. 2, it will be understood that only sensor lines running in orthogonal directions on the sensor which would also be adjacent to one another when routed along the edge of touch sensor 110 are shown in FIG. 2 for sake of illustration. It will therefore be understood that any suitable number of sensor lines 114x and 114y may be included in touch sensor 110 without departing from the present disclosure.

Because sensor 110 is configured to be a hybrid capacitive touch sensor, ground lines (e.g., ground lines 212) are required to be disposed between the adjacent X and Y tracks (e.g., sensor lines 114x and 114y) to accommodate mutual-capacitive modes of operation in the touch sensor 110. This allows for better isolation between the signals on sensor lines 114x and 114y in mutual-capacitive modes of sensing. In addition, driven guard lines (e.g., guard lines 214) are required to be disposed between each driven line (e.g., sensor lines 114x or 114y) and an adjacent ground line (e.g. ground line 212b) to accommodate self-capacitive modes of operation in the touch sensor 110. This allows for better signal detection in self-capacitive modes of sensing. As illustrated, however, as many as sixteen ground lines 212 and guard lines 214 may be necessary to accommodate each mode of sensing in a hybrid capacitive touch sensor. This may require substantial space at the edge or bezel of a touch screen device, which may be undesirable.

Accordingly, particular embodiments of the present disclosure may incorporate hybrid ground/guard lines (as described further below with respect to FIG. 3) in place of the separate ground lines 212 and guard lines 214 shown in FIG. 2. Such hybrid lines may be grounded while the hybrid capacitive touch sensor 110 is operating under mutual-capacitive modes of sensing, but be driven similar to the guard lines 214 while the sensor 110 is operating under self-capacitive modes of sensing. In addition, the hybrid lines may require less space than the separate ground lines 212 and guard lines 214 as shown in FIG. 2. Thus, hybrid lines according to particular embodiments of the present disclosure may allow for proper, accurate touch sensing in both modes of operation of a hybrid capacitive touch sensor (i.e., self- and mutual-capacitive modes), while allowing for a smaller bezel of the device incorporating the touch sensor and requiring less costs for manufacturing the device. Further, the use of hybrid lines according to embodiments of the present disclosure may lead to a smaller bonding area for touch sensor designs incorporating FPCs, which may be desirable in such products.

Figure 3:
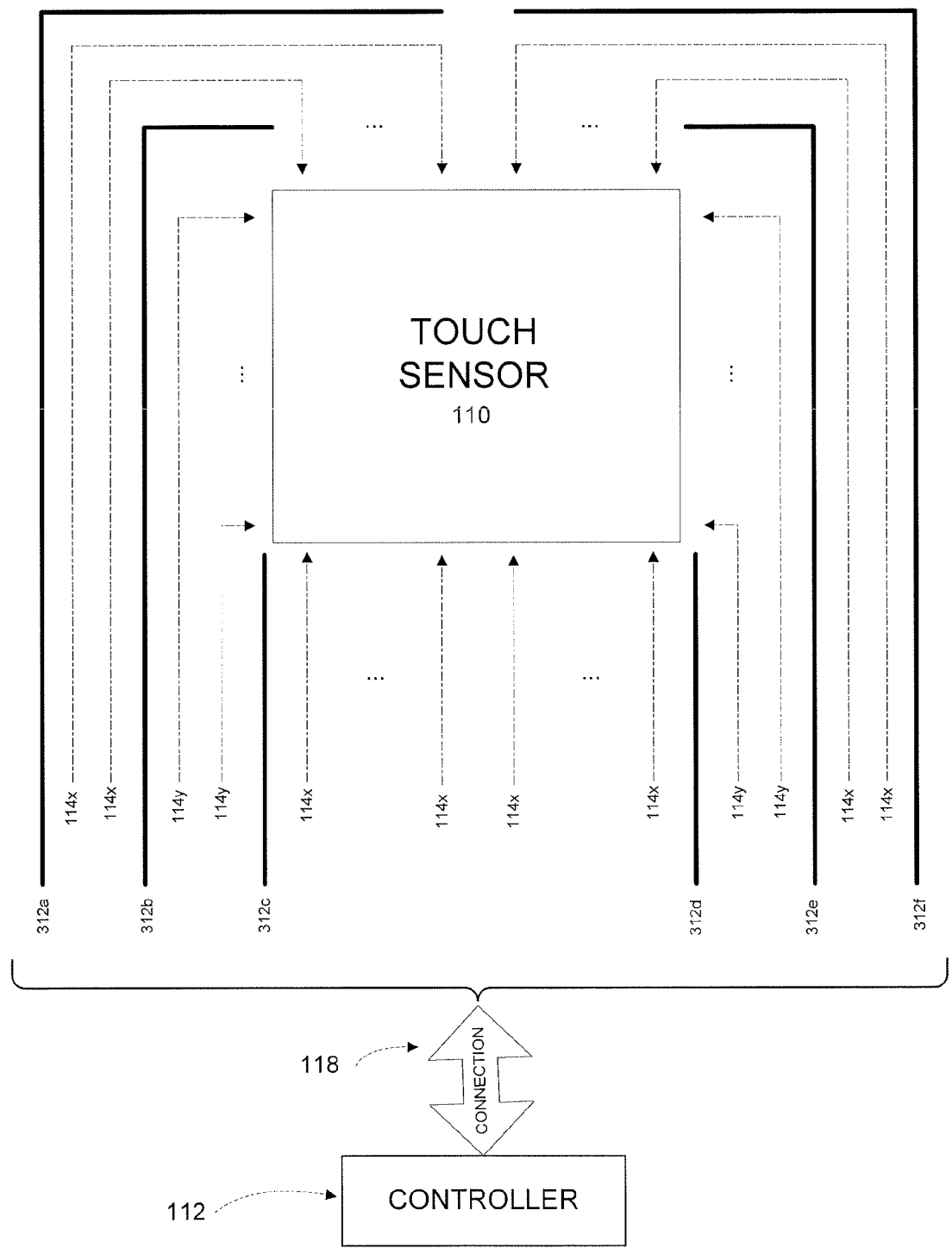
FIG. 3 illustrates an alternative example trace routing diagram for hybrid capacitive touch sensors according to particular embodiments of the present disclosure.

FIG. 3 illustrates an alternative example trace routing diagram for hybrid capacitive touch sensor 110 according to particular embodiments of the present disclosure. Similar to FIG. 2, hybrid capacitive touch sensor 110 has sensor lines 114x and 114y (representing tracks running along sensor 110 in the X and Y directions, respectively) exiting the sensor 110 and being routed around sensor 110 toward connection 118 to connect to controller 112. Although only four sensor lines 114x and two sensor lines 114y are shown in FIG. 3 (like FIG. 2), it will be understood that only sensor lines running in orthogonal directions on the sensor which would also be adjacent to one another when routed along the edge of touch sensor 110 are shown in FIG. 2 for sake of illustration. It will therefore be understood that any suitable number of sensor lines 114x and 114y may be included in touch sensor 110 without departing from the present disclosure.

Just as described above, sensor 110 may require ground lines disposed between adjacent X and Y tracks (e.g., sensor lines 114x and 114y) to accommodate mutual-capacitive modes of operation in the touch sensor 110, and may also require driven guard lines disposed between each driven line (e.g., sensor lines 114x and 114y) and an adjacent ground line (e.g., ground line 212b) to accommodate self-capacitive modes of operation in the touch sensor 110. However, rather than using separate ground lines and guard lines (e.g. ground lines 212 and guard lines 214 of FIG. 2), hybrid lines 312 may be used instead. In particular embodiments, hybrid lines 312 may be grounded while touch sensor 110 is operating under mutual-capacitive modes of sensing, but may be driven (similar to the guard lines 214 of FIG. 2) while touch sensor 110 is operating under self-capacitive modes of sensing. In certain embodiments, hybrid lines 312 may require less space on a device incorporating touch sensor 110 than ground lines 212 and guard lines 214 shown in FIG. 2. For example, a hybrid line 312 may be 150 µm wide in some embodiments, while a combination of ground lines 212 and guard lines 214 replaced by a hybrid line (e.g., two guard lines 314 and one guard line 312) may be 250 µm wide all together.

Controller 112 may determine what mode of operation hybrid capacitive touch sensor 110 shall operate under. In other words, controller 112 may determine when touch sensor 110 shall operate under a mutual-capacitive touch sensing mode and when touch sensor 110 shall operate under a self-capacitive touch sensing mode. For example, because mutual-capacitive modes of sensing are preferred for simultaneous multiple touch inputs (e.g., multi-touch gestures), controller 112 may operate touch sensor 110 in a mutual-capacitive mode of operation when multiple touches are sensed on touch sensor 110. Similarly, because self-capacitive modes of sensing are preferred for single touch inputs (e.g., using one finger or a stylus), controller 112 may operate touch sensor 110 in a self-capacitive mode of operation when a single touch input is sensed on touch sensor 110. In self-capacitive modes of operation, controller 112 may drive hybrid lines 312 with any suitable signal to facilitate self-capacitive touch sensing on touch sensor 110. For example, in some embodiments, the signal on hybrid lines 312 may be the same drive signal on the driven lines of touch sensor 110. In other embodiments, the signal on hybrid lines 312 may be different from the drive signal on the driven lines of touch sensor 110. In particular embodiments, the drive signal on hybrid lines 312 may be a waveform such as a square waveform or a triangle waveform.

In certain embodiments, because hybrid lines 312 are outside the touch sensor area, controller 112 may drive and sense at hybrid lines 312 during self-capacitive modes of operation to determine whether a user is performing touch inputs at the edge or bezel of a device incorporating touch sensor 110. In addition, in certain embodiments, a ground line may be incorporated into a hybrid capacitive touch sensor design such as that shown in FIG. 3 without departing from the scope of the present disclosure. For example, a ground line may be routed along the outside of the routing area for purposes of addressing electrostatic discharge.

Figure 4:
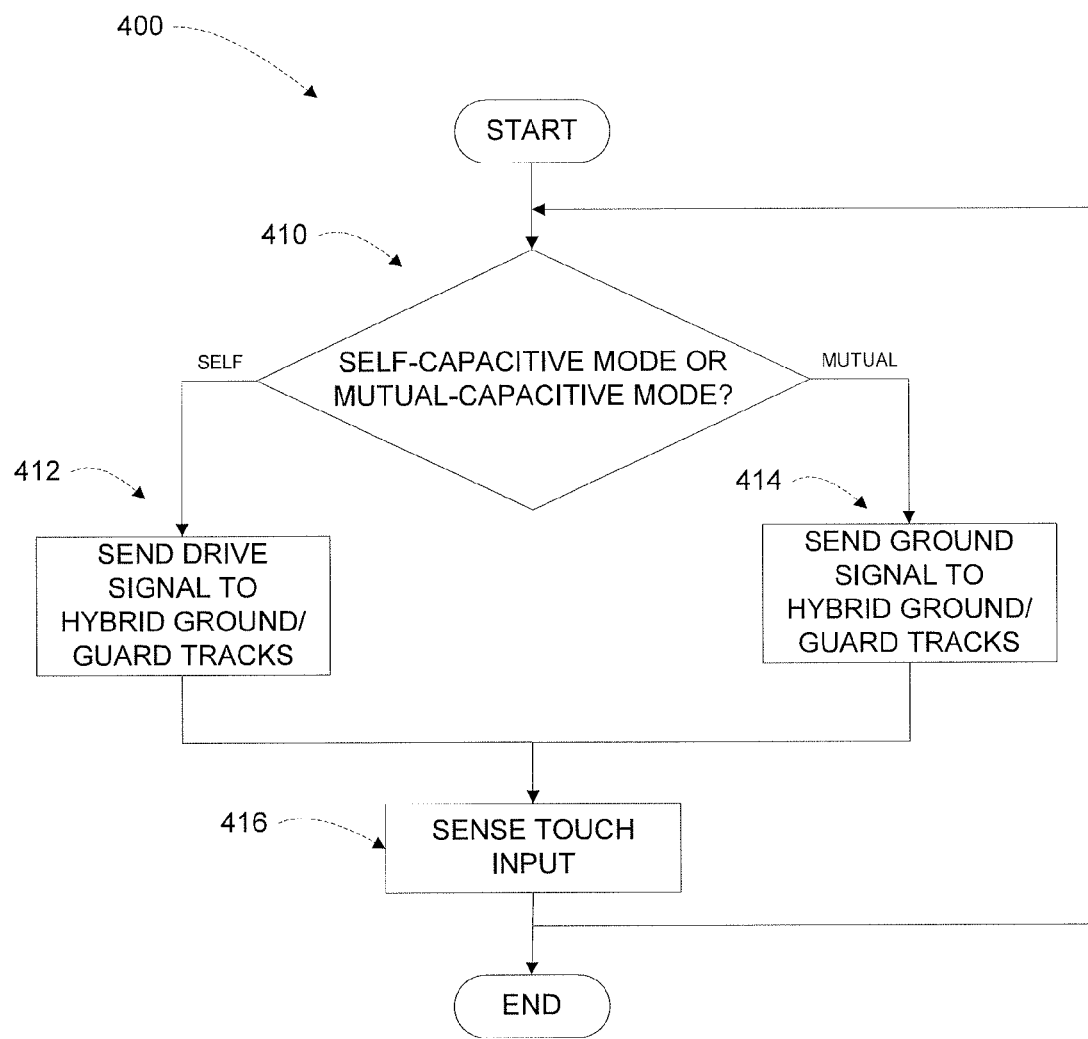
FIG. 4 illustrates an example method for sensing touch inputs using a hybrid capacitive touch sensor according to particular embodiment of the present disclosure.

FIG. 4 illustrates an example method 400 for sensing touch inputs using a hybrid capacitive touch sensor according to particular embodiment of the present disclosure. Method 400 may be performed, in particular embodiments, by one or more processors executing one or more instructions stored in a computer-readable medium. For instance, method 400 may be performed by a touch sensor controller incorporating a computer system such as computer system 500 described further below with respect to FIG. 5.

The method begins at step 410, where a touch sensor controller determines whether it will operate an associated hybrid capacitive touch sensor in a mutual- or self-capacitive sensing mode. For example, referring to FIG. 3, controller 112 may determine to operate touch sensor 110 in a mutual-capacitive mode of operation when sensing multiple touch inputs, but my determine to operate touch sensor 110 in a self-capacitive mode of operation when sensing a single touch input.

If the controller determines that its associated touch sensor shall operate in a self-capacitive mode of operation, the method continues to step 412 where a drive signal is sent to hybrid ground/guard tracks routed around the touch sensor. For example, referring to FIG. 3, a drive signal may be sent to hybrid lines 312 by controller 112. In some embodiments, the signal on hybrid lines 312 may be the same drive signal on the driven lines of touch sensor 110 in the self-capacitive mode of operation. In other embodiments, the signal on hybrid lines 312 may be different from the drive signal on the driven lines of touch sensor 110. In particular embodiments, the drive signal on hybrid lines 312 may be a waveform such as a square waveform or a triangle waveform. If, however, the controller determines that its associated touch sensor shall operate in a mutual-capacitive mode of operation, the method continues to step 414 where a ground signal is sent to hybrid ground/guard tracks routed around the touch sensor.

Once a mode of operation has been chosen by the touch sensor controller and the appropriate signal sent to hybrid ground/guard tracks routed around the touch sensor, the method continues to step 416 where the controller may detect touch input on the associated touch sensor using the chosen mode of operation. Touch input may be sensed using the chosen mode of operation until the controller determines (e.g., in response to an event) that the other mode of operation should be chosen. For example, if the controller is operating the touch sensor in a self-capacitive mode of operation (e.g., driving the hybrid ground/guard line with a waveform) due to single touches being sensed on the touch sensor, it may continue to do so until it detects a second, simultaneous touch input at the touch sensor (e.g. a multi-touch gesture) that would be better sensed by the controller using a mutual-capacitive mode of operation. In response to this detection, the controller may determine to change to a mutual-capacitive mode of operation and send a ground signal to the hybrid ground/guard tracks routed around the touch sensor and begin touch sensing using the mutual-capacitive mode of operation.

Particular embodiments may repeat the steps of method 400 of FIG. 4 where appropriate. Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
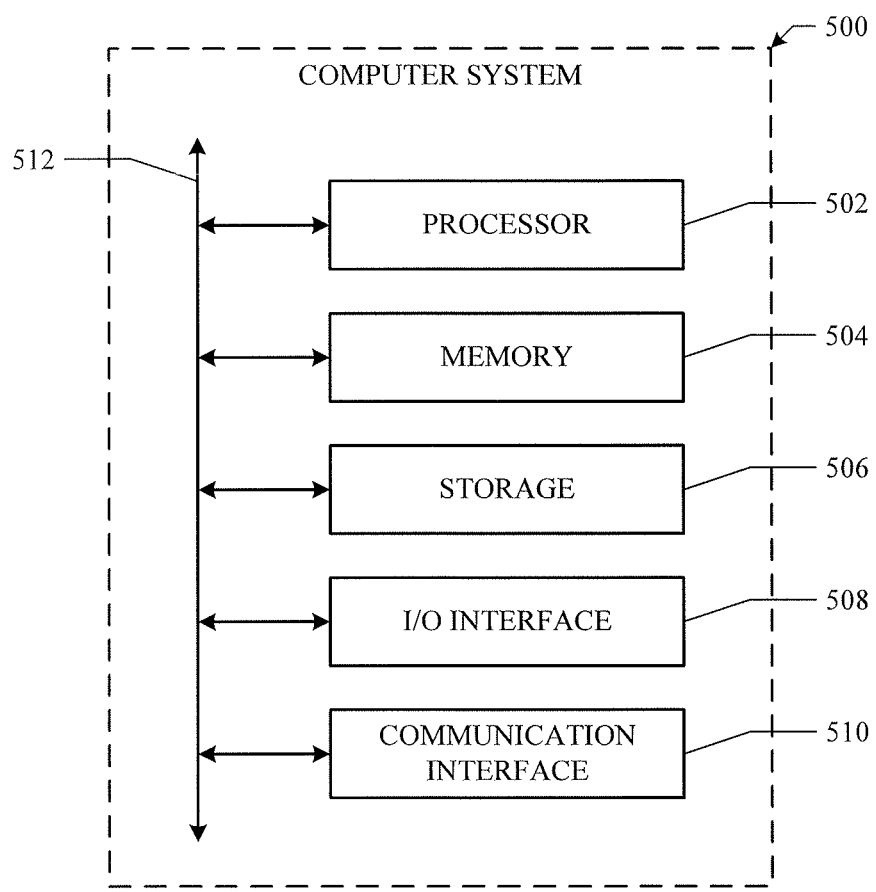
FIG. 5 illustrates an example computer system for use with the hybrid capacitive touch sensor of FIGS. 1-3 according to particular embodiments of the present disclosure.

FIG. 5 illustrates an example computer system 500 for use with the hybrid capacitive touch sensor of FIGS. 1-3 according to particular embodiments of the present disclosure. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. In particular embodiments, the software running on one or more computer systems 500 may be logic encoded on a computer readable medium. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
   a first set of lines of conductive material;
   a touch sensor comprising a second set of lines of conductive material and a third set of lines of conductive material, wherein:
   the second set and third set of lines of conductive material are disposed inside the touch sensor and outside the touch sensor; and
   the first set of lines of conductive material is disposed outside the touch sensor and between the second set of lines of conductive material disposed outside the touch sensor and the third set of lines of conductive material disposed outside the touch sensor; and
   one or more non-transitory computer-readable storage media coupled to the touch sensor and embodying logic that is configured when executed by a processor to perform operations comprising:
   determining whether to operate the touch sensor in a mutual-capacitive mode of operation or a self-capacitive mode of operation;
   in response to determining to operate in a mutual-capacitive mode of operation, applying a ground signal to the first set of lines of conductive material and sensing touch inputs at the touch sensor using mutual-capacitive touch sensing; and
   in response to determining to operate in a self-capacitive mode of operation, applying a voltage signal to the first set of lines of conductive material and sensing touch inputs at the touch sensor using self-capacitive touch sensing.

2. The system of claim 1, wherein sensing touch inputs at the touch sensor using mutual-capacitive touch sensing comprises:
   applying a drive signal to the second set of lines of conductive material; and
   sensing signals on the third set of lines of conductive material.

3. The system of claim 2, wherein the drive signal applied to the second set of lines of conductive material comprises a waveform signal.

4. The system of claim 1, wherein sensing touch inputs at the touch sensor using self-capacitive touch sensing comprises:
   applying a drive signal to the second set of lines of conductive material; and
   applying a ground signal to the third set of lines of conductive material.

5. The system of claim 4, wherein the voltage signal applied to the first set of lines of conductive material is the same as the drive signal applied to the second set of lines of conductive material.

6. The system of claim 1, wherein determining whether to operate the touch sensor in a mutual-capacitive mode of operation or a self-capacitive mode of operation is based on sensed touch inputs at the touch sensor.

7. The system of claim 1, wherein the logic is further operable to, in response to determining to operate in a self-capacitive mode of operation, sense touch inputs based on detected changes in the voltage signal on the first set of lines of conductive material.

8. A method, comprising:
   determining to operate a touch sensor in a mutual-capacitive mode of operation;
   in response to determining to operate in a mutual-capacitive mode of operation, applying a ground signal to a first set of lines of conductive material and sensing touch inputs at the touch sensor using mutual-capacitive touch sensing;
   determining to operate the touch sensor in a self-capacitive mode of operation; and
   in response to determining to operate in a self-capacitive mode of operation, applying a voltage signal to the first set of lines of conductive material and sensing touch inputs at the touch sensor using self-capacitive touch sensing.

9. The method of claim 8, wherein the touch sensor comprises a second set of lines of conductive material and a third set of lines of conductive material, and sensing touch inputs at the touch sensor using mutual-capacitive touch sensing comprises:
   applying a drive signal to the second set of lines of conductive material; and
   sensing signals on the third set of lines of conductive material.

10. The method of claim 9, wherein the drive signal applied to the second set of lines of conductive material comprises a waveform signal.

11. The method of claim 8, wherein the touch sensor comprises a second set of lines of conductive material and a third set of lines of conductive material, and sensing touch inputs at the touch sensor using self-capacitive touch sensing comprises:
   applying a drive signal to the second set of lines of conductive material; and
   applying a ground signal to the third set of lines of conductive material.

12. The method of claim 11, wherein the voltage signal applied to the first set of lines of conductive material is the same as the drive signal applied to the second set of lines of conductive material.

13. The method of claim 8, wherein determining to operate the touch sensor in a mutual-capacitive mode of operation is based on sensed touch inputs at the touch sensor.

14. The method of claim 8, wherein determining to operate the touch sensor in a self-capacitive mode of operation is based on sensed touch inputs at the touch sensor.

15. A non-transitory computer-readable medium embodying instructions that are configured when executed by the processor to perform operations comprising:
   determining to operate a touch sensor in a mutual-capacitive mode of operation;
   in response to determining to operate in a mutual-capacitive mode of operation, applying a ground signal to a first set of lines of conductive material and sensing touch inputs at the touch sensor using mutual-capacitive touch sensing;
   determining to operate the touch sensor in a self-capacitive mode of operation; and
   in response to determining to operate in a self-capacitive mode of operation, applying a voltage signal to the first set of lines of conductive material and sensing touch inputs at the touch sensor using self-capacitive touch sensing.

16. The non-transitory computer-readable medium of claim 15, wherein the touch sensor comprises a second set of lines of conductive material and a third set of lines of conductive material, and the instructions are configured to sense touch inputs at the touch sensor using mutual-capacitive touch sensing by:

applying a drive signal to the second set of lines of conductive material; and sensing signals on the third set of lines of conductive material.

17. The non-transitory computer-readable medium of claim 16, wherein the drive signal applied to the second set of lines of conductive material comprises a waveform signal.

18. The non-transitory computer-readable medium of claim 15, wherein the touch sensor comprises a second set of lines of conductive material and a third set of lines of conductive material, and the instructions are configured to sense touch inputs at the touch sensor using self-capacitive touch sensing by:

applying a drive signal to the second set of lines of conductive material; and applying a ground signal to the third set of lines of conductive material.

19. The non-transitory computer-readable medium of claim 18, wherein the voltage signal applied to the first set of lines of conductive material is the same as the drive signal applied to the second set of lines of conductive material.

20. The non-transitory computer-readable medium of claim 15, wherein the instructions configured to determine to operate the touch sensor in a mutual-capacitive mode of operation are configured to determine to operate the touch sensor in a mutual-capacitive mode based on sensed touch inputs at the touch sensor.

21. The non-transitory computer-readable medium of claim 15, wherein the instructions configured to determine to operate the touch sensor in a self-capacitive mode of operation are configured to determine to operate the touch sensor in a self-capacitive mode based on sensed touch inputs at the touch sensor.

* * * * *